June 2, 1931.  C. C. CADDEN  1,808,525
STRIP FEEDING APPARATUS
Filed Sept. 11, 1928  2 Sheets-Sheet 2
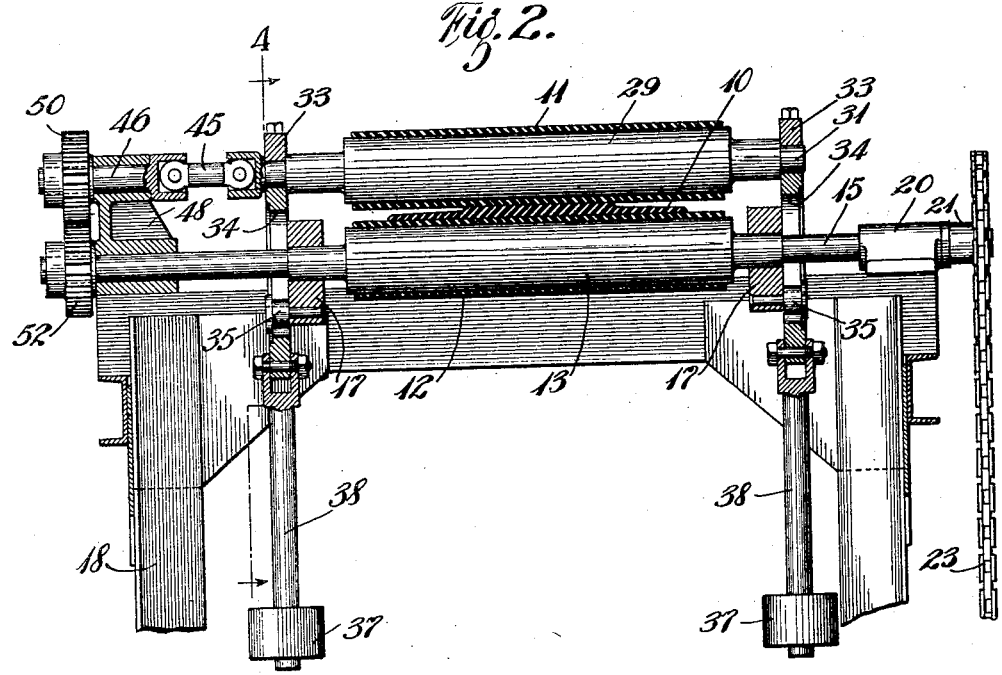
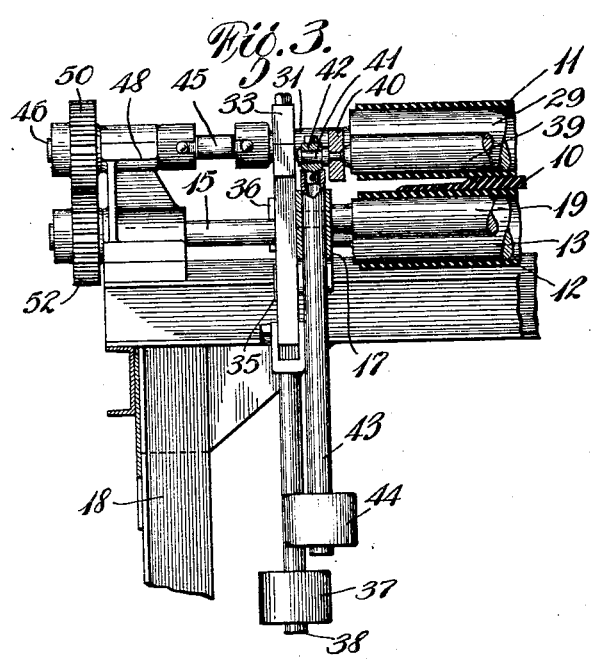
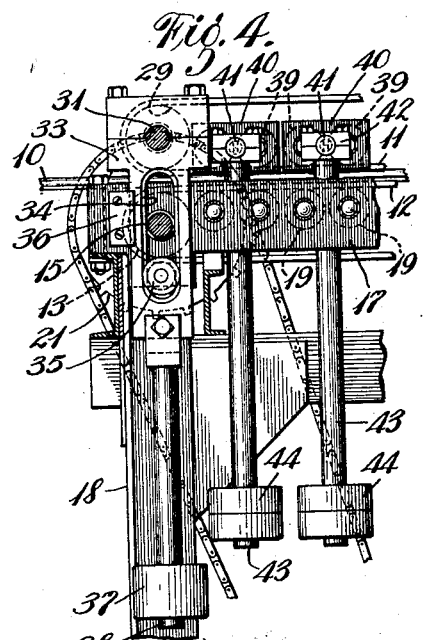
Inventor
Charles C. Cadden
By Eakin & Avery Attys.

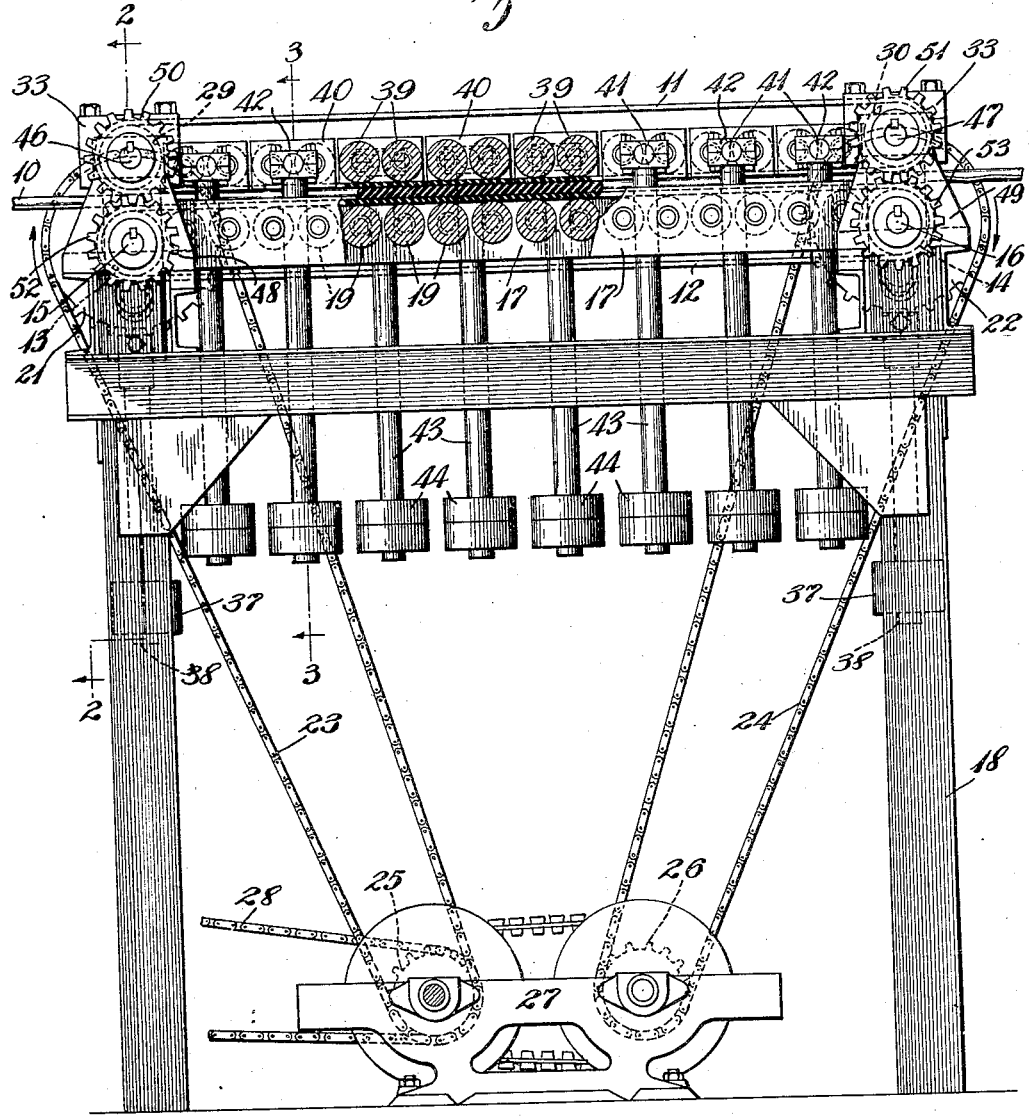

Patented June 2, 1931

1,808,525

UNITED STATES PATENT OFFICE

CHARLES C. CADDEN, OF AKRON, OHIO, ASSIGNOR TO THE B. F. GOODRICH COMPANY, OF NEW YORK, N. Y., A CORPORATION OF NEW YORK

STRIP-FEEDING APPARATUS

Application filed September 11, 1928. Serial No. 305,168.

This invention relates to the art of effecting shrinkage in strip material, as in the case of a continuous strip of plastic unvulcanized rubber composition fed from a calender or an extruding machine and requiring to be promptly shrunk in preparation for its use in manufacturing processes.

My chief objects are to expedite the shrinkage of plastic strip or sheet material to provide uniform shrinkage of the material and to provide simple procedure and apparatus for feeding the material while effecting shrinkage thereof.

Of the accompanying drawings:

Fig. 1 is a side elevation of apparatus embodying and adapted to carry out my invention in its preferred form, and the work therein, a part being broken away and in section.

Fig. 2 is a section on line 2—2 of Fig. 1.

Fig. 3 is a section on line 3—3 of Fig. 1.

Fig. 4 is a section on line 4—4 of Fig. 2.

Referring to the drawings, apparatus embodying my invention is herein shown, for the purpose of illustration, as operating upon a continuous slab or strip of unvulcanized rubber 10, from which individual slabs of suitable length for the treads of pneumatic tire casings are subsequently severed while the strip, delivered from my apparatus, continues to possess much of its original surface tackiness, the strip 10 being delivered to the apparatus either directly from the calender or extruding machine wherein it is formed, or after it has been cooled, as by being passed through a cold water bath.

The apparatus comprises a pair of driven elastic conveyor belts 11, 12 mounted one over the other, the lower reach of the belt 11 and the upper reach of the belt 12 being backed by suitable rollers so as to be adapted to bear strongly against the upper and lower faces respectively of the slab 10 to avoid slippage as the slab is conveyed between them. The belts are provided with means for driving them faster at their work-receiving ends than at their work-delivery ends so that they are stretched as they pass through their return reaches and contract as they move forward in contact with the slab, and thus exert a longitudinal compressive force upon the strip, which is continuously received by them at a relatively high speed and continuously delivered from them at a slower speed appropriate to its shrunken condition.

The lower conveyor belt 12 is mounted at its respective ends upon drive pulleys 13, 14 the respective shafts 15, 16 of which are journaled in parallel journal beams 17, 17 mounted upon opposite sides of the apparatus upon the framework 18 thereof. The upper reach of the belt 12 is firmly supported upon a series of closely-spaced parallel rollers, 19, 19 disposed transversely of the belt and journaled in the journal beams 17 between the drive pulleys 13, 14.

At one side of the device the shafts 15, 16 extend beyond the journal beam 17 and through respective journal brackets such as the bracket 20, Fig. 2, and are provided with respective sprockets 21, 22 connected by sprocket chains 23, 24 with sprockets 25, 26 on the respective driving and driven shafts of a variable-speed device 27 of well-known construction, the latter being power-driven through the sprocket chain 28 from any suitable source. The arrangement is such that the drive pulleys 13, 14 may be driven at differential speeds from a common source of power, the pulley 13 at the work-receiving end of the apparatus being driven faster than the pulley 14 at the work-delivery end thereof.

The upper conveyor belt 11 is mounted at its respective ends upon drive pulleys 29, 30 the respective shafts of which, such as the shaft 31, are journaled at each end in journal brackets 33, 33 slidably mounted for vertical movement upon the journal beams 17. Each bracket 33 is formed with a central slot 34 through which the shaft 15 or 16 extends, and flanged rollers 35, 35 journaled upon the journal beams 17 are positioned within the respective slots 34 for guiding the brackets 33 and maintaining them in vertical position. Respective cleats 36 which are secured to the journal beams 17 and engage the outer faces of the brackets 33 also are provided for guiding and retaining the latter. Respective weights 37, 37 mounted upon rods 38, 38 which are pivotally connected to the brackets 33 at the lower ends of the latter are provided for urging the belt pulleys 29, 30 downward toward the belt pulleys 13, 14 of the lower conveyor belt 12, to assure firm engagement of the latter and the conveyor belt 11 with the respective faces of the strip material 10 therebetween.

For further assuring firm contact of the conveyor belts 11, 12 with the strip 10 throughout the full length of their engagement therewith, to resist forward movement of the belts from the strip-receiving position to the strip-delivering position and thus to cause the belts to lose their stretch gradually instead of abruptly and consequently allow sufficient time for the strip to contract with the belts, and to prevent buckling of the strip 10 under the compressive longitudinal force, the lower, work-engaging reach of the conveyor belt 11 is yieldingly urged against the strip 10 by a plurality of closely-spaced parallel presser rollers 39, 39 which are disposed transversely of the belt and are journaled in pairs upon two series of journal blocks 40, 40 disposed at opposite sides of the apparatus. Each journal block 40 is provided on its outer face with a single trunnion 41 positioned between the journals of the rollers 39 and parallel thereto, and said trunnion is mounted in a bearing bracket 42 from which is suspended a rod 43 which carries a weight 44 at its lower end, the rods 43 of the several bearing brackets being slidably mounted for vertical movement in respective bores in the journal beams 17. The arrangement is such that respective rollers 39 are normally urged downward upon the lower reach of the belt 11, and because of the pivotal arrangement of the journal blocks 40, each roller 39 is free to rise or fall independently of its adjacent rollers. The journal-friction of the rolls 19 and 39 imposes a retarding force upon the belts so that the belts lose their stretch or shorten gradually as they pass from the strip-receiving position toward the strip-delivering position.

The drive pulleys 29, 30 of the conveyor belt 11 are driven at the same speed as the respective pulleys 13, 14 of the conveyor belt 12. For so driving the pulleys 29, 30 the respective shafts 31 thereof are connected at one end by respective universal joints such as the universal joint 45, Figs. 2 and 3, with one end of relatively short shafts 46, 47 journaled in bearing brackets 48, 49 mounted upon the framework 18 at opposite ends thereof. The other ends of the shafts 46, 47 are provided with respective gears 50, 51 meshed with gears 52, 53 of the same size mounted upon extensions of the shafts 15, 16 also journaled in the brackets 48, 49. The arrangement is such that the drive pulleys 13, 29 are driven at the same speed, and the drive pulleys 14, 30 are driven at the same speed. The speed of the latter pulleys is slower than the speed of the pulleys 13, 29, and the direction of rotation of the pulleys is such that the adjacent work-engaging reaches of the conveyor belts 11, 12 are driven faster at their work-receiving end than at their work-delivery end, with the result that a strip of plastic material between the belts is crowded forward and compacted.

The conveyor belts 11, 12 preferably are made of rubber to permit compression of their work-engaging reaches and tension in their return reaches, and the work-engaging faces of the belts may be covered with extensible fabric such as stockinet or otherwise treated to provide good frictional engagement with the work.

My invention is susceptible of modification within the scope of the appended claims.

I claim:

1. Strip-feeding apparatus comprising means for feeding the strip at a determinate speed, means nearer the delivery end of the apparatus for concurrently feeding the strip at a less speed such as to effect longitudinal compression of the strip and means for laterally confining the strip to a substantially straight course.

2. Strip-feeding apparatus comprising a pair of elastic endless conveyor belts adapted to engage the opposite faces of the strip to feed the same between them, means for driving the belts at a relatively fast speed at their strip-receiving position, means for driving them at a relatively slow speed at their strip-delivering position, and backing means for the strip-contacting reaches of the belts to cause them closely to restrict the strip between them.

3. Strip-feeding apparatus comprising an elastic belt adapted to convey a strip longitudinally disposed thereon, means for driving the belt at a relatively fast speed at its strip-receiving position, means for driving it at a relatively slow speed at its strip-delivering position, and means operative between the two said positions for resisting the forward movement of the belt to cause it to retain a part of its stretch while it moves a substantial distance from its strip-receiving position.

In witness whereof I have hereunto set my hand this 4th day of September, 1928.

CHARLES C. CADDEN.